US006745758B1

(12) United States Patent
Minidis

(10) Patent No.: US 6,745,758 B1
(45) Date of Patent: Jun. 8, 2004

(54) COOKING OVEN

(76) Inventor: James Minidis, 40320 Nidl Ct., Palmdale, CA (US) 93551

( * ) Notice: Subject to any disclaimer, the term of this patent is extended or adjusted under 35 U.S.C. 154(b) by 0 days.

(21) Appl. No.: 10/324,701

(22) Filed: Dec. 19, 2002

(51) Int. Cl.[7] .............................................. F24C 15/08

(52) U.S. Cl. ......................... 126/55; 126/277; 126/305

(58) Field of Search .................... 126/55, 277, 278, 126/305, 8

(56) References Cited

U.S. PATENT DOCUMENTS 4,213,443 A * 7/1980 Morande, Jr. ................ 126/72
6,199,549 B1 * 3/2001 Yerkes ....................... 126/276

FOREIGN PATENT DOCUMENTS

JP          355049633 A   *  4/1980

* cited by examiner

Primary Examiner—Alfred Basichas
(74) Attorney, Agent, or Firm—Dennis W. Beech

(57) ABSTRACT

The cooking oven may have a rotating floor for cooking food items. An insulation structure may be supported on a bottom floor and have a floor positioned above the bottom floor with the floor rotatable. An infrared heating element may be positioned below the floor and be oriented to radiate the floor. A rear heating element may be positioned in a rear portion of the insulation structure in a horizontal plane with the floor and intermediate the insulation structure and the floor. The insulation structure and the floor may define a cavity and the insulation structure may have an access opening to the cavity. A vent system may be positioned above the access opening and there may be an outer enclosure.

29 Claims, 2 Drawing Sheets

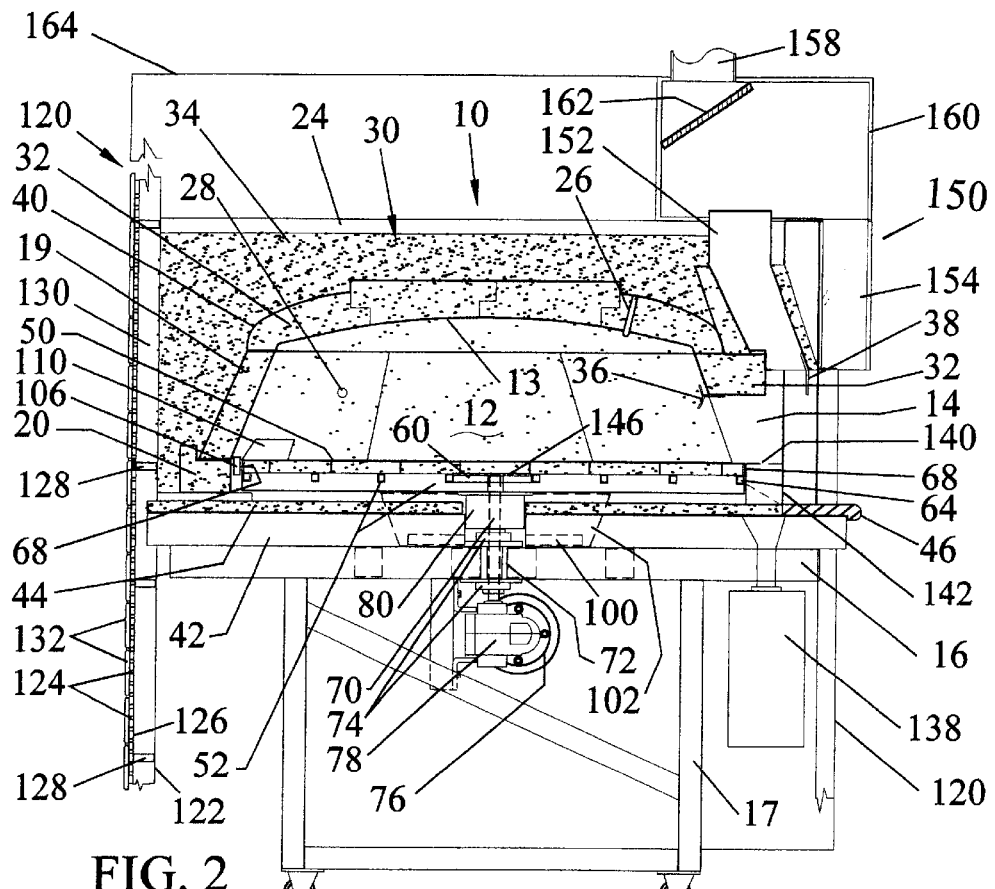
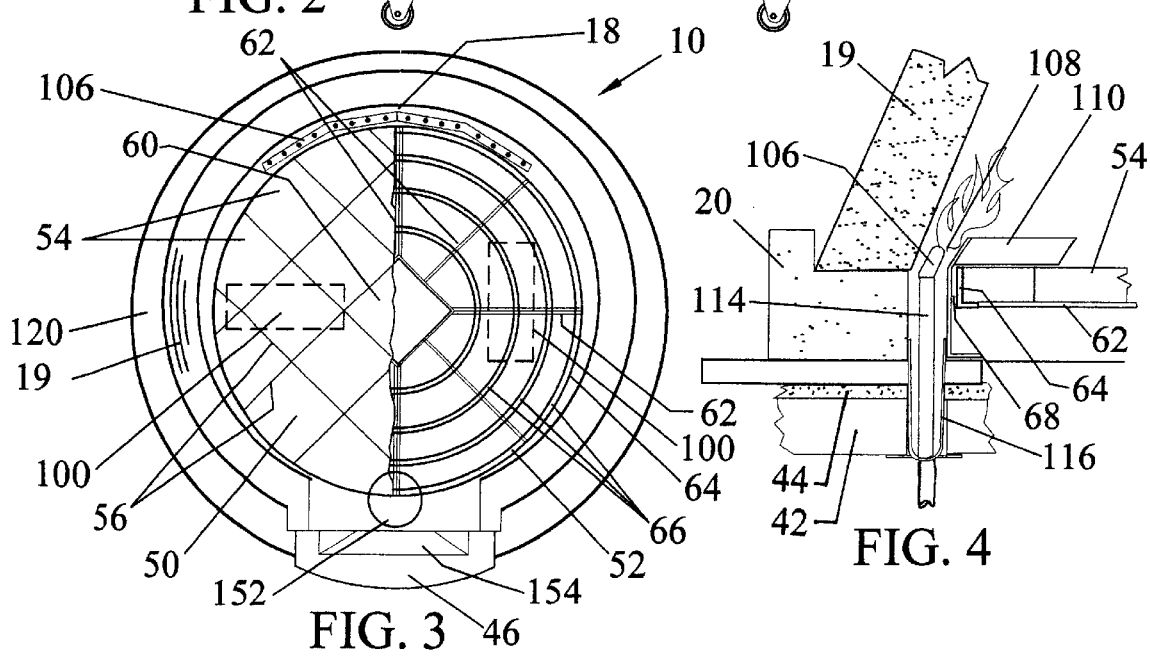
FIG. 2
FIG. 3
FIG. 4

COOKING OVEN

BACKGROUND OF THE INVENTION

This invention relates to apparatus for cooking of food items. The new cooking oven may have infrared heating under a rotatable floor and a gas rear heating element to direct heat to a cavity dome. There may be an open access opening in combination with a dual hood vent system.

Cooking ovens using convection, conduction and radiant heating have been known in the art. Cooking ovens that include a rotatable cooking floor have also been developed in the art. The particular arrangement of the oven enclosure or insulation structure, the cooking floor and the heating elements may determine the cooking quality and efficiency of a particular oven. Also, the desire to have an oven access opening that does not require closure for efficient oven operation may determine the structure of the oven elements. Known ovens for cooking food items such a pizza that may include a rotatable floor have not optimized the use of infrared heating elements positioned under the cooking floor or positioned a rear gas heating element structured to convection heat the oven cavity by directing flame to heat a cavity dome.

SUMMARY OF THE INVENTION

The present invention is directed to cooking ovens for food items. An insulation structure may be supported on a bottom floor and have a floor positioned above the bottom floor with the floor rotatable. An infrared heating element may be positioned below the floor and be oriented to radiate the floor. A rear heating element may be positioned in a rear portion of the insulation structure in a horizontal plane with the floor and intermediate the insulation structure and the floor. The insulation structure and the floor may define a cavity and the insulation structure may have an access opening to the cavity. A vent system may be positioned above the access opening and there may be an outer enclosure.

These and other features, aspects and advantages of the present invention will become better understood with reference to the following drawings, description and claims.

BRIEF DESCRIPTION OF THE DRAWINGS

FIG. 2 illustrates a side elevation cross sectional view of the cooking oven according to an embodiment of the invention;

FIG. 3 illustrates a top plan partial cross sectional view of the cooking oven according to an embodiment of the invention;

FIG. 4 illustrates a partial side elevation cross sectional view of the rear of the cooking oven according to an embodiment of the invention.

DETAILED DESCRIPTION

Figure 1:
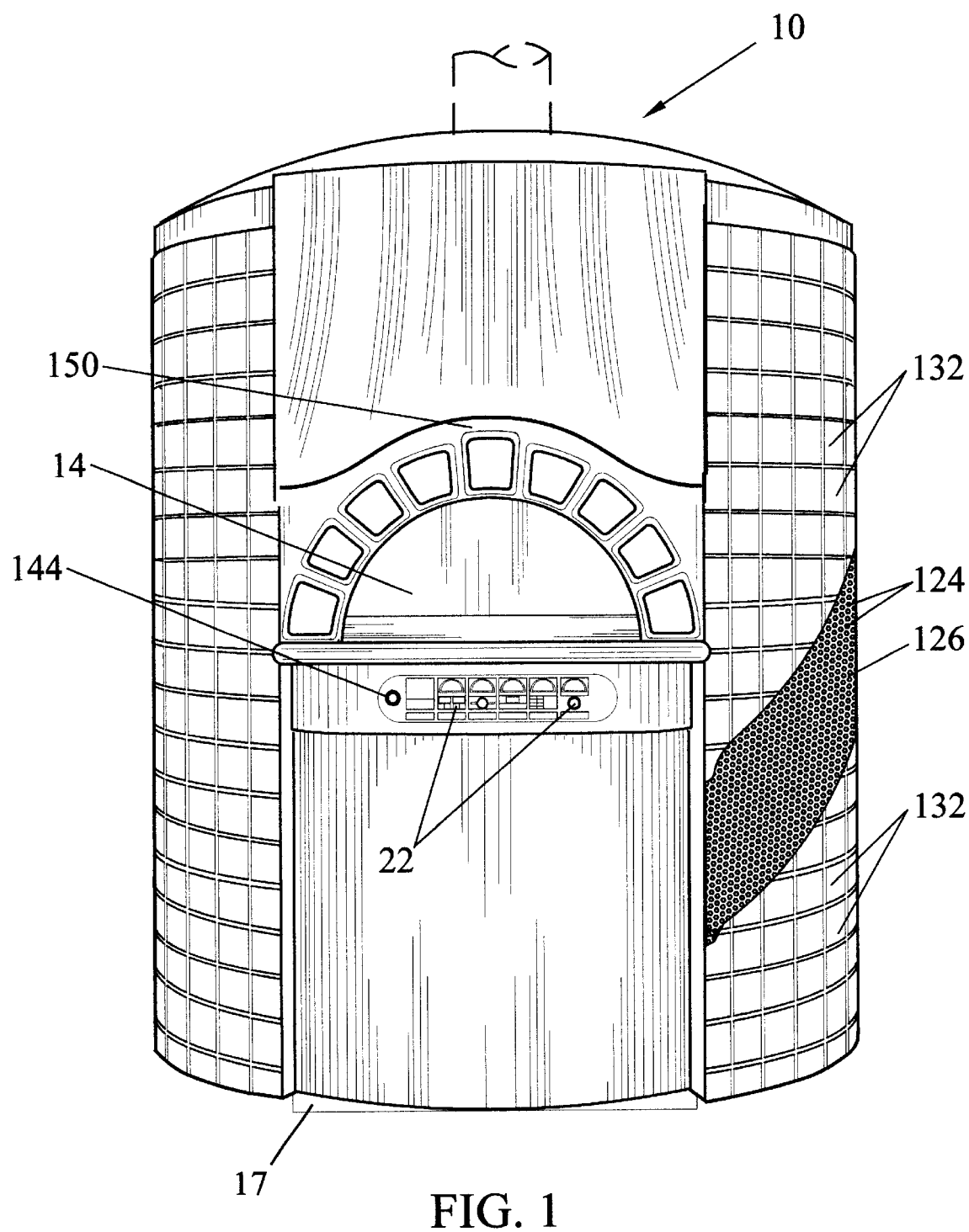
FIG. 1 illustrates a front elevation view of the cooking oven with cutaway view of the outer enclosure elements according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 3, a cooking oven 10 may have an outer enclosure 120 of generally cylindrical shape with an interior insulation structure 30 and floor 50 generally defining a cavity 12 having an access opening 14. The floor 50 may be generally circular in shape having a support structure 52 for support of floor tiles 54. The floor 50 and interior insulation structure 30 may be shaped to minimize the gap between the floor 50 outer edge and the interior insulation structure 30.

Referring to FIGS. 2 and 3, the support structure 52 may have a central pivot support element 60 that may be square in shape and have radial support arms 62 extending therefrom to be attached to a circumferential outer annular member 64. There may also be sectional annular support elements 66 intermittent the pivot support element 60 and the outer annular member 64.

The floor tiles 54 may be generally square in shape except for the outer circumferential elements that may be formed with curved portions to mate with the outer annular member 64 as illustrated in FIG. 3. The floor tiles 54 may be placed on the support structure 52 along mating edges 56 and against a flange 68 of the outer annular member 64 to be retained in place to form a rotatable cooking floor 50 for an oven. Use of support members 62, 64 and 66 that are narrow horizontally and wide vertically may allow efficient infrared radiant heating of the floor tiles 54 while providing adequate structural support.

Use of floor tiles 54 and the elements and members of the support structure 52 with a center hub 70 may allow assembly of a rotatable cooking floor 50 in an existing cooking oven by access through the access opening 14 without the need to disassemble the oven. The floor 50 may also be disassembled and removed for servicing. The floor 50 may be assembled above an existing cooking surface or structure that may include a bottom floor 44 and bottom insulation structure 42. Location of the floor 50 closer to the cavity dome 13 as compared to bottom floor 44 may improve cooking efficiency due to dome 13 heating effects. Bottom floor 44 may not be necessary. Use of pivot support element 60 may reduce heat concentration at the floor 50 center. An insulation material or pad 146 may be incorporated with the pivot support element 60 to further reduce concentration of heat in the center of the floor 50 and may provide for a more relatively uniform heat distribution.

The support structure 52 with pivot support element 60 having hub shaft 72 to form center hub 70 may have hub shaft 72 rotationally mounted in an insulated bearing assembly 74 that is attached to an oven support structure 16 and frame structure 17. The bearing assembly 74 may have two inverted heat sealed flange tapered roller bearings. There may be a bearing insulation element 80 intermediate the pivot support element 60 and the bearing assembly 74.

One bearing may be for thrust load and one bearing may be for alignment loading. The hub shaft 72 may be attached to a drive motor 76. The bearing assembly 74 and drive motor 76 may be mounted below a bottom insulation structure 42 that may be an existing cooking surface or insulation layer of an existing oven or that may be a new structure in order to reduce exposure to heat of the oven. The support structure 52 may be coated with a ceramic baked material to transfer heat away from the structural metal, alloy or like material to reduce warping of the elements The drive motor 76 may have a gear assembly 78 and controller (Not Shown). The floor 50 may be controlled for a rotation of one revolution per bake cycle that may be approximately 3 minutes.

For efficient heating a pair of infrared heating elements 100 may be located below the floor 50 on the bottom floor 44 or in the bottom insulation structure 42 of a new construction cooking oven 10 or an existing oven. The infrared heating elements 100 may be positioned 180 degrees radially apart and with each ones longitudinal axis at 90 degrees relatively one to the other as illustrated in FIG. 3. The infrared heating elements 100 may have an infrared metal enclosure 102 thereround that may extend through bottom insulation structure 42 and bottom floor 44 to be open just below support structure 52 to inhibit the entry of debris into the infrared heating elements 100.

Referring to FIGS. 2 through 4, the floor 50 may be slightly offset from the center of the cavity 12 to allow space in a rear portion 18 of the cavity 12 for installation of a rear heating element 106 that may be of the gas flame type and attached to a gas source by gas pipe 114. The rear heating element 106 may be positioned in the same horizontal plane as the floor 50 and may be curved to approximate the contour of the floor 50 and the insulation structure 40 of the cooking oven 10.

The rear heating element 106 may be partitioned into sections, for example, four sections to vary the heating produced in various areas of the cavity 12. The heating element 106 may be a curved pipe with sections created therein or may be for example four straight pieces of pipe joined at angles to create an arch shape. The heating apertures 108 in the rear heating element 106 may be oriented to direct flame and thereby heat upward and away from a center line oriented toward the opening 14, and toward cavity dome 13 for heat circulation as well as to avoid directing heat toward opening 14. The heating apertures 108 may be structured to provide a generally white visual burning flame as well as to produce reduced burn residue that may reduce soot build up in the oven. A flame shield 110 of steel or other suitable material may be placed forwardly, intermittent the rear heating element 106 and the floor 50 to reduce excessive burning of a pizza crust or other cooking items and to inhibit debris from falling on rear heating element 106.

There may be a heating element shield 112 generally enclosing the rear heating element 106 except for the upper portion having the heating apertures 108. There may also be a heating element access closure 116 that may be removed to allow removal of the rear heating element 106 from under the insulation structure 40 and bottom insulation structure 42 for purposes of cleaning the rear heating element 106.

Referring to FIGS. 2 and 3, the interior insulation structure 30 may include clay hearth stones 32 for the cavity dome 13 and sides 19. The stones 32 may be approximately 2 inches thick. There may be a dome base 20 of clay hearth stones 32 that may extend approximately two inches under the support structure 52. The extension may further aid in heat retention or insulation for cavity 12 and may inhibit debris from falling under the floor 50. The insulation structure 34 may be a high density material insulation blanket with air pockets or like element as a secondary insulation layer 34 and may be covered with a top cover 24 that may be steel.

An outer enclosure 120 may have an interior metal wall 122 that may have a high temperature resistant coating. There may be an exterior metal wall 126 separated from the interior metal wall 122 by annular spacing rings 128 to determine an air gap 130 therebetween. The exterior metal wall 124 may have perforations 124 therein. There may be an exterior cover 132 of tile affixed to the exterior metal wall 126 or other exterior finishes. Insulation may also be introduced into the air gap 130 if required by environmental considerations. The outer enclosure 120 may be sized vertically to not touch the floor or ceiling of the facility for the cooking oven 10 intended use. It has been found that approximately six inches of clearance from a facility floor may give appropriate spacing. This may allow movement of the oven within the facility and air circulation under the oven. The outer enclosure 120 may have attachment positions to facilitate the attachment of materials and devices.

There may be a crumb tray 142 positioned across the access opening 14 lower portion adjacent the floor 50 and supported on bottom floor 44. The crumb tray 142 may have a vacuum slot 140 positioned adjacent to the floor 50 into which debris, crumbs and the like may be swept or moved. The crumb tray 142 may be removable to remove accumulated debris or it may have an access panel. There may be a vacuum canister 138 connected to the crumb tray 142 by a hose or other means. Any debris, crumbs, etc. may be collected and automatically moved to the vacuum slot 140 to be removed to the vacuum canister 138 or container. There may also be a vacuum connector 144 on the control panel 22, as best viewed in FIG. 1, to which a hose (not shown) may be connected for use in cleaning the front of the cooking oven.

A dual hood vent system 150 may have a flue element 152 inside access opening 14 and an eyebrow hood 154 located exterior over access opening 14. The eyebrow hood 154 may be curved in shape about the access opening 14 and extend approximately six inches to the right, left and outwardly therefrom, and may be positioned approximately two inches above the arch of the access opening 14. The eyebrow hood 154 may be curved to be positioned adjacent to the arched opening 14 to capture as much smoke as possible that may escape through access opening 14. There may be an exhaust hood 160 communicating between the eyebrow hood 154, the flue element 152 and a main vent 158. The flue element 152 may have a portion positioned at an angle from vertical between the access opening 14 and the exhaust hood 160 to create a positive air flow upwardly from access opening 14. There may be an interior deflector shield 36 attached to the cavity dome 13 adjacent to the access opening 14 to divert heat away from the opening and toward the cavity 12. There may also be an access opening deflector shield 38 attached adjacent to flue element 152 to divert heat into the flue element 152. There may be a grease filter 162 positioned in the exhaust hood 160 prior to main vent 158.

Infrared sensors 26 may be located in the cavity dome 13 to sense temperature in the rotating cooking surface or floor 50. The infrared sensor 26 may be located in the forward portion of the cavity dome 13 where the cooking temperature may be relatively cooler due to the access opening 14. There may also be a dome infrared sensor 28 positioned in side 19 to sense temperature of the cavity dome 13. There may be a controller (not shown) connected to the sensors and to a control panel 22. The control panel 22 may include graphic indicators depicting the actions and steps for oven start-up, set conditions, emergency shutdown and cleaning modes of operation. The controller may compare the sensors 26, 28 to an optimal baking temperature to control the heating of the rear heating element 106 and the infrared heating elements 100. The sensors may be set to automatically adjust infrared heating elements 100 to maintain a baking temperature condition under varying baking condition requirements.

While the invention has been particularly shown and described with respect to the illustrated embodiments thereof, it will be understood by those skilled in the art that the foregoing and other changes in form and details may be made therein without departing from the spirit and scope of the invention.

I claim:

1. A cooking oven for cooking food items comprising:
   an insulation structure supported on a bottom floor and having a floor positioned above said bottom floor and rotatable relative thereto;
   an infrared heating element positioned below said floor oriented to radiate said floor;
   a rear heating element positioned in a rear portion of said insulation structure in a horizontal plane with said floor and intermediate said insulation structure and said floor;
   said insulation structure and said floor defining a cavity and said insulation structure having an access opening to said cavity;
   a vent system positioned above said access opening; and
   an outer enclosure.

2. The cooking oven as in claim 1 wherein there are two infrared heating elements positioned 180 degrees radially apart and each infrared heating element is oriented at 90 degrees one relative to the other on a longitudinal axis.

3. The cooking oven as in claim 2 wherein said infrared heating elements are enclosed in an infrared metal enclosure.

4. The cooking oven as in claim 1 wherein said rear heating element having heating apertures oriented to direct a flame toward a cavity dome and away from a center line oriented toward said opening.

5. The cooking oven as in claim 1 wherein said rear heating element is partitioned into four sections.

6. The cooking oven as in claim 1 wherein said outer enclosure is suspended approximately six inches above any floor structure on which the cooking oven may be located.

7. The cooking oven as in claim 1 wherein there is a heating element access closure for removal of said rear heating element.

8. The cooking oven as in claim 1 wherein there is a flame shield positioned forwardly, intermittent said rear heating element and said floor.

9. The cooking oven as in claim 1 wherein said floor comprising a support structure and a plurality of floor tiles supported thereon.

10. The cooking oven as in claim 9 wherein said support structure comprising:
    a pivot support element having a plurality of support arms;
    an outer annular member attached to said support arms and said outer annular member having a flange;
    a plurality of sectional annular support members attached to said support arms intermediate said pivot support element and said outer annular member;
    a hub shaft attached to and extending downwardly from said pivot support element;
    said hub shaft rotationally mounted in a bearing assembly and attached to a drive motor.

11. The cooking oven as in claim 10 wherein there is an insulation pad intermediate said pivot support element and said floor tiles.

12. The cooking oven as in claim 10 wherein said bearing assembly is a dual inverted heat sealed bearing assembly and a bearing insulation element is positioned intermediate said pivot support element and said bearing assembly.

13. The cooking oven as in claim 1 wherein said insulation structure having a generally annular side on a dome base and supporting a cavity dome.

14. The cooking oven as in claim 1 wherein said insulation structure is formed of a plurality of clay hearth stones.

15. The cooking oven as in claim 1 wherein there is a secondary insulation layer about said insulation structure.

16. The cooking oven as in claim 1 wherein there is an interior deflector shield attached to a cavity dome adjacent to said access opening.

17. The cooking oven as in claim 1 wherein said vent system comprising a dual hood vent system integrated with said outer enclosure housing a flue element position above said access opening and an eyebrow hood positioned forwardly of said access opening.

18. The cooking oven as in claim 17 wherein there is an access opening deflector shield attached adjacent to said flue element.

19. The cooking oven as in claim 17 wherein said eyebrow hood and said flue element are in communication with an exhaust hood having a grease filter therein and said exhaust hood in communication with a main vent.

20. The cooking oven as in claim 17 wherein said eyebrow hood lower edge is positioned approximately at least three inches above said access opening upper curve portion.

21. The cooking oven as in claim 17 wherein said eyebrow hood lower edge is positioned approximately ten inches forward of said access opening and approximately parallel to said access opening upper curve portion.

22. The cooking oven as in claim 1 wherein said floor is offset from a center of said insulation structure to facilitate installation of said rear heating element.

23. The cooking oven as in claim 1 wherein said outer enclosure comprising:
    an interior metal wall and an exterior metal wall separated by a plurality of annular spacing rings thereby forming an air gap; and
    said exterior metal wall having a plurality of perforations therein and having an exterior cover.

24. The cooking oven as in claim 1 wherein there is a crumb tray positioned across said access opening in a lower portion thereof said crumb tray having a slot formed therein generally adjacent said floor, and a vacuum canister attached to said crumb tray.

25. The cooking oven as in claim 1 wherein there is a control panel located thereon connected to a controller that controls the temperature of said cooking cavity; and said controller connected to an infrared sensor and a dome infrared sensor.

26. The cooking oven as in claim 25 wherein said control panel having a vacuum connector.

27. A cooking oven for cooking food items comprising:
    an insulation structure supported on a bottom floor and having a floor positioned above said bottom floor and rotatable relative thereto;
    two infrared heating elements positioned below said floor oriented to radiate said floor wherein each infrared heating element is positioned 180 degrees radially apart and each infrared heating element is oriented at 90 degrees one relative to the other on a longitudinal axis;
    said infrared heating elements are enclosed in an infrared metal enclosure that extends above said bottom floor;
    a rear heating element positioned in a rear portion of said insulation structure in a horizontal plane with said floor and intermediate said insulation structure and said floor;
    said rear heating element having heating apertures oriented to direct a flame toward a cavity dome and away from a center line oriented toward said opening;
    said rear heating element is partitioned into four sections;

there is a flame shield positioned forwardly, intermittent said rear heating element and said floor;

said insulation structure and said floor defining a cavity and said insulation structure having an access opening to said cavity;

said insulation structure having a generally annular side on a dome base and supporting a cavity dome;

said insulation structure is formed of a plurality of clay hearth stones;

there is a secondary insulation layer about said insulation structure;

a vent system positioned above said access opening; and an outer enclosure.

28. The cooking oven as in claim 27 wherein;

said vent system comprising a dual hood vent system integrated with said outer enclosure housing a flue element position above said access opening and an eyebrow hood positioned forwardly of said access opening; and said eyebrow hood and said flue element are in communication with an exhaust hood having a grease filter therein and said exhaust hood in communication with a main vent.

29. A cooking oven for cooking food items comprising:

an insulation structure supported on a bottom floor and having a floor positioned above said bottom floor and rotatable relative thereto;

two infrared heating elements positioned below said floor oriented to radiate said floor wherein each infrared heating element is positioned 180 degrees radially apart and each infrared heating element is oriented at 90 degrees one relative to the other on a longitudinal axis;

said infrared heating elements are enclosed in an infrared metal enclosure;

a rear heating element positioned in a rear portion of said insulation structure in a horizontal plane with said floor and intermediate said insulation structure and said floor;

said rear heating element having heating apertures oriented to direct a flame toward a cavity dome and away from a center line oriented toward said opening;

said rear heating element is partitioned into four sections;

there is a flame shield positioned forwardly, intermittent said rear heating element and said floor;

said insulation structure and said floor defining a cavity and said insulation structure having an access opening to said cavity;

said insulation structure having a generally annular side on a dome base and supporting a cavity dome;

said insulation structure is formed of a plurality of clay hearth stones;

there is a secondary insulation layer about said insulation structure;

said floor comprising a support structure and a plurality of floor tiles supported thereon;

said support structure comprising:

a pivot support element having a plurality of support arms;

an outer annular member attached to said support arms and said outer annular member having a flange;

a plurality of sectional annular support members attached to said support arms intermediate said pivot support element and said outer annular member;

a hub shaft attached to and extending downwardly from said pivot support element;

said hub shaft rotationally mounted in a bearing assembly and attached to a drive motor;

said bearing assembly is a dual inverted heat sealed bearing assembly and a bearing insulation element is positioned intermediate said pivot support element and said bearing assembly;

there is an insulation material intermediate said pivot support element and said floor tiles;

a vent system positioned above said access opening wherein said vent system comprising a dual hood vent system housing a flue element position above said access opening and eyebrow hood positioned forwardly of said access opening;

said eyebrow hood is connected to a vent angle upwardly and rearwardly to communicate with a main vent; and an outer enclosure.

* * * * *